US012535844B2

(12) United States Patent
Carton et al.

(10) Patent No.: US 12,535,844 B2
(45) Date of Patent: Jan. 27, 2026

(54) PADDLE BUTTON

(71) Applicant: CROUZET, Valence (FR)

(72) Inventors: Hervé Carton, Valence (FR); Damien Beurdeley, Valence (FR)

(73) Assignee: CROUZET, Valence (FR)

( * ) Notice: Subject to any disclaimer, the term of this patent is extended or adjusted under 35 U.S.C. 154(b) by 286 days.

(21) Appl. No.: 18/256,561

(22) PCT Filed: Dec. 3, 2021

(86) PCT No.: PCT/EP2021/084107
§ 371 (c)(1),
(2) Date: Jun. 8, 2023

(87) PCT Pub. No.: WO2022/122570
PCT Pub. Date: Jun. 16, 2022

(65) Prior Publication Data
US 2024/0019887 A1 Jan. 18, 2024

(30) Foreign Application Priority Data
Dec. 9, 2020 (FR) ...................................... 2012930

(51) Int. Cl.
*G05G 1/01* (2008.04)
*G05G 1/015* (2008.04)
(Continued)

(52) U.S. Cl.
CPC ............... *G05G 1/01* (2013.01); *G05G 1/015* (2013.01); *G05G 1/04* (2013.01); *H01H 21/22* (2013.01)

(58) Field of Classification Search
CPC ............ G05G 1/01; G05G 1/015; G05G 1/04; G05G 2700/22; G05G 1/06; H01H 21/22;
(Continued)

(56) References Cited

U.S. PATENT DOCUMENTS 4,395,608 A 7/1983 Eicker et al.
5,492,511 A * 2/1996 Kozminski ............ G05G 13/00 477/96

FOREIGN PATENT DOCUMENTS

DE 102009053717 A1 5/2011
EP 2040274 A1 3/2009
(Continued)

OTHER PUBLICATIONS

International Search Report for International Application No. PCT/EP2021/084107, mailed Mar. 23, 2022, 5 pages with English translation.

(Continued)

*Primary Examiner* — Lheiren Mae A Caroc
(74) *Attorney, Agent, or Firm* — TraskBritt

(57) ABSTRACT

A paddle button, operable by a user, includes first and second paddles mechanically attached to each other only via a separable zone so as to allow only simultaneous movement of the first and second paddles as long as no blocking of one of the paddles relative to the other occurs. The separable zone is capable of yielding as soon as the difference between the pressing forces exerted, on the first and second paddles respectively, exceeds a predetermined threshold. The predetermined threshold is adjusted so as to be crossed if the user presses on one of the paddles while the movement of the other of the paddles is blocked.

10 Claims, 2 Drawing Sheets

(51) Int. Cl.
*G05G 1/04* (2006.01)
*H01H 21/22* (2006.01)

(58) Field of Classification Search
CPC .......... H01H 3/04; H01H 21/02; H01H 21/18; H01H 2021/225; H01H 21/24; H01H 21/30; H01H 23/02; H01H 23/12; H01H 23/14; H03K 2217/94057; H03K 2217/9658; H03K 17/965; H03K 17/967
See application file for complete search history.

(56) References Cited

FOREIGN PATENT DOCUMENTS

| | | | |
|---|---|---|---|
| EP | 2258577 | A1 | 12/2010 |
| EP | 2902242 | A1 | 8/2015 |
| FR | 2498004 | A1 | 7/1982 |
| FR | 2861213 | A1 | 4/2005 |
| GB | 2407708 | B | 5/2005 |
| WO | 2012/154188 | A1 | 11/2012 |

OTHER PUBLICATIONS

International Written Opinion for International Application No. PCT/EP2021/084107, mailed Mar. 23, 2022, 8 pages with English machine translation.

* cited by examiner

PADDLE BUTTON

CROSS-REFERENCE TO RELATED APPLICATIONS

This application is a national phase entry under 35 U.S.C. § 371 of International Patent Application PCT/EP2021/084107, filed Dec. 3, 2021, designating the United States of America and published as International Patent Publication WO 2022/122570 A1 on Jun. 16, 2022, which claims the benefit under Article 8 of the Patent Cooperation Treaty of French Patent Application Serial No. FR2012930, filed Dec. 9, 2020.

TECHNICAL FIELD

The disclosure relates to a paddle button as well as to a method of operating this paddle button.

BACKGROUND

Paddle buttons are able to generate a signal based on the position of a paddle along a path. The paddle is moved manually along this path by a user.

Paddle buttons form part of the human-machine interfaces used to control electrical equipment. When such a paddle button is integrated into the instrument panel of a controllable device such as an airplane or a helicopter, it is particularly important to achieve robust operation of this button. Indeed, a failure of the button can then have serious consequences. Robust is to be understood to mean both mechanically robust and robust in terms of the information it produces.

In order to increase the robustness of this button with regard to failures, various solutions are known. According to a first solution, the position of the paddle is measured by a first and a second position sensor, the sensors being independent of each other. Thus, if one of these sensors fails, the other sensor makes it possible to overcome this failure. On the other hand, if the movement of the paddle is blocked, the two sensors are inoperative, so the button is no longer usable.

To overcome this drawback of the first solution, a second solution has been proposed. This second solution is identical to the first solution except that the button has a first and a second paddle that can be moved independently of each other along the path. The position of the first paddle is measured by the first sensor and the position of the second paddle is measured by the second sensor. The first and second paddles are sufficiently close to each other to be moved simultaneously by the user using a single digit. If the movement of one of these paddles is blocked, the user can continue to use the button by moving only the other paddle.

On the other hand, when using such a two-paddle button, it can happen that the user accidentally engages with just one of the two paddles. In this case, one of the paddles is moved and the other is not. This results in an inconsistency between the measurements of the first and second sensors. The electronic computer that acquires the measurements from the first and second sensors does not know, in such a case, which is the measurement that represents the true intention of the user. This can lead to the generation of an unexpected command and, therefore, to unexpected behavior of the equipment that is being controlled. The computer may also conclude that there is a fault and initiate an appropriate procedure.

Prior art is also known from WO2012/154188A1 and EP2258577A1.

BRIEF SUMMARY

Embodiments of the disclosure seek to overcome at least one of the aforementioned disadvantages. It therefore relates to a paddle button according to claim 1.

The disclosure also relates to a method of operating the paddle button according to claim 10.

BRIEF DESCRIPTION OF THE DRAWINGS

The disclosure will be better understood on reading the following description, which is given solely by way of non-limiting example, with reference to the drawings, in which.

DETAILED DESCRIPTION

In the remainder of this description, features and functions that are well known to those skilled in the art are not described in detail. In this description, detailed examples of embodiments are first described in Section I with reference to the figures. Subsequently, in Section II, variants of these embodiments are presented. Lastly, the advantages of the various embodiments are presented in Section III.

Section I: Examples of Embodiments

Figure 1:
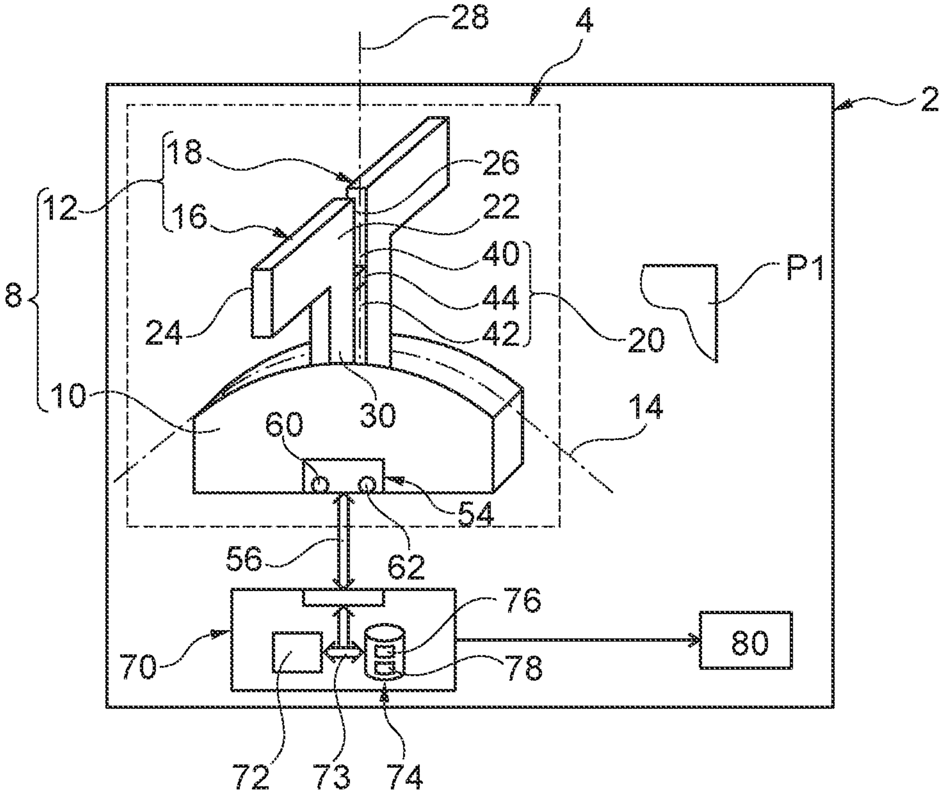
FIG. 1 is a schematic illustration of a device equipped with a paddle button.

FIG. 1 depicts a device 2 that can be controlled by a user via a human-machine interface 4. The device 2 is, for example, a vehicle controlled by a human being. The device 2 can be an airplane, a helicopter, a motor vehicle, a train, a boat, inter alia. In this context, the human-machine interface must be robust against failures.

The human-machine interface 4 is, for example, that of an airplane or helicopter cockpit. To simplify FIG. 1, only a paddle button 8 of this human-machine interface 4 is shown.

The paddle button 8 comprises a fixed frame 10 and a lever 12 that can be moved by hand by a user relative to the frame 10. The frame 10 is, for example, fixed on an instrument panel.

The lever 12 can be moved reversibly between a retracted position and a pushed position. In this embodiment, the lever 12 can be moved using a single digit of the user's hand. In FIG. 1, the lever 12 is depicted in an intermediate position, in which it extends mainly vertically. Between the retracted position and the pushed position, the paddle moves along a path 14. In this embodiment, the path 14 is an arc of a circle.

The lever 12 comprises two paddles 16 and 18 mechanically connected to each other by a separable zone 20. In this embodiment, the paddles 16 and 18 are symmetrical to each other with respect to a vertical plane P1 containing the path 14 and passing through the separable zone 20. Therefore, in the following, only the paddle 16 is described in more detail.

The paddle 16 has a front pressing face 22 that extends mainly in a plane perpendicular to the path 14. The surface of the front face 22 is shaped to press against part of the user's digit. For this purpose, its surface area is generally greater than 1 $cm^2$. To limit its size, the surface area of the front face 22 is also generally less than 10 $cm^2$ or 5 $cm^2$.

On the opposite side to the front face 22, the paddle 16 has a rear face 24. For example, the rear face 24 is the symmetrical image of the front face 22 with respect to a plane perpendicular to the path 14.

The paddle 16 also has a lateral face 26 facing toward the paddle 18. The lateral face 26 extends, between the front 22 and rear 24 faces, mainly in a plane parallel to the plane P1. The lateral face 26 therefore faces a corresponding lateral face of the paddle 18 and is separated from this paddle 18 by a vertical lateral boundary 28. The boundary 28 extends mainly vertically in the plane P1.

Figure 2:
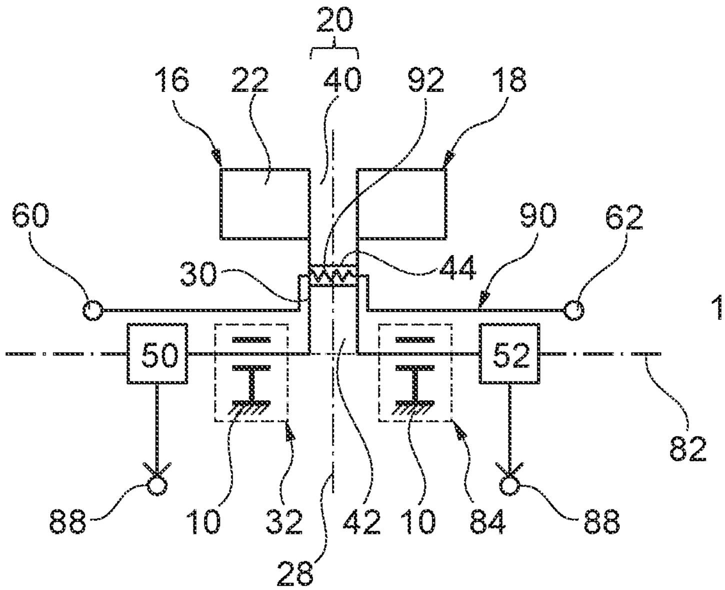
FIG. 2 is a schematic illustration of a first embodiment of the paddle button of FIG. 1.

The paddle 16 also has a root 30 that connects it mechanically to a guide mechanism 32 (FIG. 2). The mechanism 32 guides the movement of the paddle 16 along the path 14. Here, the mechanism 32 is located inside the frame 10.

In order to be systematically and simultaneously moved together in a normal operation mode, the paddles 16 and 18 are mechanically connected to each other via the separable zone 20. This zone 20 is referred to as "separable," because if the movement of one of the paddles 16, 18 is blocked, then by using the digit to push on only the other paddle, the separable zone yields and the paddles 16 and 18 are then no longer mechanically connected to each other. When the paddles 16 and 18 are no longer mechanically connected to each other, the mode of operation of the paddle button 8 is said to be "downgraded."

The separable zone 20 is designed to remain intact, that is to say not to yield, as long as the difference between the pressing forces exerted by the user on the front faces of the paddles 16 and 18 does not exceed a predetermined threshold $S_1$. Here, this threshold $S_1$ is greater than or equal to $2F_{min}$ or $3F_{min}$, where $F_{min}$ is equal to the minimum force that the user must exert on the front faces of the paddles 16, 18 in order to move the lever 12 from its retracted position to its pushed position in the normal operation mode. Typically, in the case of paddles moved using a single digit, the force $F_{min}$ is between 0.5 N and 10 N, and most often between 1 N and 7 N or between 3 N and 7 N.

The threshold $S_1$ is also usually less than $10F_{min}$ or $5F_{min}$, and preferably less than $4F_{min}$. Thus, the force to be exerted by the user in order to switch from the normal operation mode to the downgraded operation mode is not too high.

In this first embodiment, the paddles 16 and 18 and the separable zone 20 form one and the same block of material. In this case, zone 20 is a breakable zone. Thus, the paddles 16 and 18 and the separable zone 20 can be manufactured by molding using the one same single mold comprising the hollow impression of these paddles 16 and 18, and of the zone 20. For this, zone 20 is formed in one piece with the paddles. More precisely, it is formed by recesses made in the block of material along the boundary 28. By way of illustration, in FIG. 1, zone 20 includes:

- an upper recess 40;
- a lower recess 42;
- a horizontal arm 44 that mechanically connects the paddles 16 and 18 together.

Here, the recesses 40 and 42 are bounded on each side by the lateral faces of the paddles 16 and 18. In this embodiment, the recesses 40 and 42 pass through the entire thickness of the block of material from which the paddles 16 and 18 are made. These recesses 40 and 42 therefore form slots.

Preferably, the horizontal width of the upper recess 40 is small so that the user's digit can press on the front faces of the paddles 16 and 18 simultaneously. Typically, the width of the upper recess 40 is less than 5 mm and, preferably, less than 1 mm or 0.5 mm.

The recesses 40 and 42 are separated from each other in the vertical direction by the arm 44 of material. Here, this arm 44 forms a beam that extends horizontally from the lateral face of the paddle 16 to the lateral face of the paddle 18. The cross section of the arm 44 is sized to break when the difference between the pressing forces exerted on the front faces of the paddles 16 and 18 reaches the threshold $S_1$. To this end, the material used to make the paddles 16, 18 and the zone 20 is a brittle material, that is to say that it breaks suddenly as soon as the shear stress in the arm 44 reaches the value $S_1/S_U$, where:

- $S_U$ is the cross-sectional area of arm 44, and
- $S_1$ is the threshold, in newtons, beyond which zone 20 yields.

For example, the material used is hard plastic or ceramic.

The angular position of the paddles 16 and 18 along the path 14 is measured by position sensors 50, 52 (FIG. 2). These sensors 50 and 52 are fixed in the frame 10.

The paddle button 8 also includes an interface 54 that connects the paddle button 8 to a data transmission network 56. More precisely, the paddle button 8 transmits, over this network 56, the measurements of the angular positions of the paddles 16 and 18. In this embodiment, the paddle button 8 is also capable of transmitting, over this network 56, information that indicates whether or not the separable zone 20 has yielded. To this end, the paddle button 8 includes two electrical terminals 60 and 62.

An electronic computer 70 is connected to the network 56 to process the measurements and the information delivered by the paddle button 8. To this end, it typically includes:

- a microprocessor 72;
- a non-volatile memory 74 containing the instructions executed by the microprocessor 72;
- an information transmission bus 73 that connects the memory 74 to the microprocessor 72.

The memory 74 here contains the instructions:

- for a module 76 for controlling equipment according to the position of the paddles 16 and 18, and
- for a module 78 for diagnosing a failure of the paddle button 8.

Here, the device 2 includes controllable equipment 80. The module 76 controls the equipment 80 according to the angular position of the paddles 16 and 18. Should the paddle button 8 fail, the module 78 is capable of communicating this to a maintenance agent, via a human-machine interface.

FIG. 2 schematically depicts the internal architecture of the paddle button 8. Here, the guide mechanism 32 is a pivot link that allows only the rotational movement of the paddle 16 about a horizontal axis 82.

The paddle 18 is mechanically connected to the frame 10 by its own guide mechanism 84. Thus, in the downgraded operation mode, the paddle 18 can be moved along the path 14 independently of the paddle 16. Here, the mechanism 84 is structurally identical to the mechanism 32. It therefore allows the paddle 18 to rotate about the axis 82.

As shown in FIG. 2, the sensor 50 measures the angular position of the paddle 16, while the sensor 52 measures the angular position of the paddle 18. The sensor 50 is able to operate independently of the sensor 52 and vice versa. Thus, in the downgraded operation mode, the sensor 50 measures the angular position of the paddle 16 independently of the angular position of the paddle 18. Conversely, in the downgraded operation mode, the sensor 52 measures the angular position of the paddle 18 independently of the angular position of the paddle 16. In the normal operation mode, the sensors 50 and 52 measure the same angular position, to within an operating clearance. Thus, in the normal operation mode, they are redundant. Consequently, even if one of these sensors fails, the other sensor is able to continue to measure and transmit the position of the lever 12. For this purpose, the paddle 16 is mechanically connected only to the sensor 50, while the paddle 18 is mechanically connected only to the sensor 52.

The sensors 50 and 52 deliver their respective measurements on terminals 88 of the interface 54 (FIG. 2).

In this embodiment, the paddle button 8 also includes an electrical connection 90 that electrically connects the terminals 60 and 62 to each other. A part 92 of this electrical connection 90 is mechanically attached to the separable zone 20 so that, when this zone yields, this also results in the severing of the part 92. When the part 92 is severed, the terminals 60 and 62 are electrically isolated from each other. Thus, the electrical conductivity between the terminals 60 and 62 has a first value in the normal operation mode and switches to a second, lower, value in the downgraded operation mode.

For example, the part 92 is a strip of electrically conductive material attached to the arm 44. This strip extends from one end of this arm to the other. Thus, when the arm 44 is broken, this tears this strip and severs the electrical connection 90.

Figure 3:
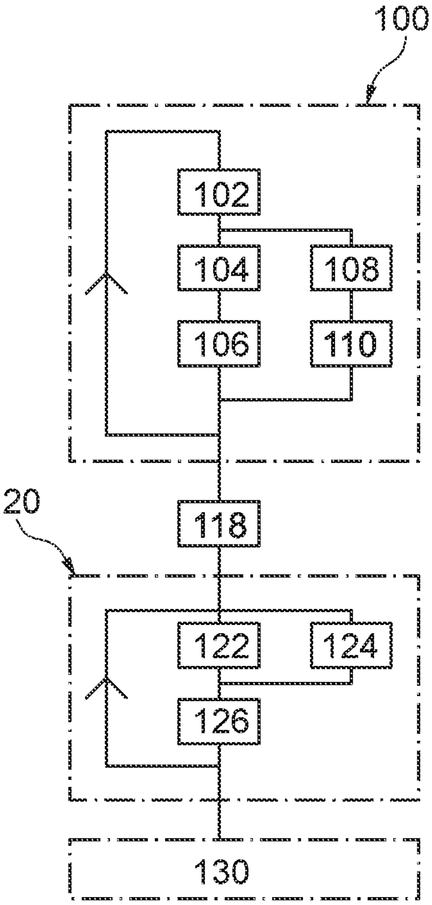
FIG. 3 is a flowchart of a method of operating the paddle button of FIG. 1.

The operation of the paddle button 8 will now be described with reference to the method of FIG. 3.

The method begins with a phase 100 during which the paddle button is in its normal operation mode. In this normal operation mode, the paddles 16 and 18 are mechanically linked to each other by the zone 20. When the user presses a digit on the two front faces of the paddles 16 and 18 simultaneously, or on only one of its front faces, the paddles 16 and 18 systematically move together along the path 14. Thus, the angular positions of the paddles 16 and 18 along the path 14 are systematically equal. In other words, the difference between the angular positions of the paddles 16 and 18 is here systematically equal to zero. Moreover, in the normal operation mode, the terminals 60 and 62 are electrically connected together.

During a step 102, the sensors 50 and 52 measure the angular positions of the paddles 16 and 18, respectively, and transmit these measurements, via the network 56, to the computer 70.

During this step 102, the electrical conductivity between the terminals 60 and 62 is also transmitted to computer 70.

In response, during a step 104, the module 76 processes these measurements and transmits to the equipment 80 a command established according to these measurements.

During a step 106, the equipment 80 executes the command received.

In parallel, during a step 108, in the event of failure of one of the sensors 50, 52, the module 76 detects this failure and triggers the execution of a corrective step 110. Here, the module 78 detects a failure when one of the sensors no longer transmits a measurement. It also detects a failure if the difference between the measurements of the sensors 50 and 52 crosses a predetermined threshold $S_2$ whereas the electrical conductivity acquired for the electrical connection 90 remains equal to its first value.

When the faulty sensor can be identified, the corrective step 110 consists, for example, in using only the measurements of the non-faulty sensor during step 104. A sensor is identified as being faulty when it no longer transmits a measurement or when it transmits measurements that are outside of a range of plausible measurements. If the faulty sensor cannot be identified, step 110 then consists, for example, in inhibiting step 104 and triggering an alarm to signal this malfunction.

Buttons such as the paddle button 8 are also subject to mechanical failures such as the blocking, for example by a foreign body, of the movement of one of the paddles 16 or 18.

In this case, in response, the user pushes harder than usual on the paddle that is not blocked. Hereinafter, it is assumed that it is the paddle 18 that is the only paddle to be blocked. When the pressing force exerted on the paddle 16 exceeds the threshold $S_1$, the zone 20 in response yields during a step 118. The mode of operation of the paddle button 8 then switches from the normal operation mode to its downgraded operation mode.

During a phase 120, the paddle button is used in this downgraded operation mode. During this phase 120, the user can continue to use the paddle button 8, but by moving only the paddle 16.

More precisely, during a step 122, the sensors 50 and 52 measure the angular position of the paddles 16 and 18. This step 122 is, for example, identical to the step 102. During the step 122, the electrical conductivity between the terminals 60 and 62 that is transmitted to the computer 70 adopts the second value, which is less than the first value.

In parallel, during a step 124, the module 78 detects that the electrical conductivity between the terminals 60 and 62 is equal to the second value. In response, it identifies which paddle is blocked. For example, in order to do this, the paddle that is identified as being blocked is the one whose angular position remains constant, while at the same time, the angular position of the other paddle varies.

Then, during a step 126, the module 76 processes the measurements from only the non-blocked paddle, that is to say here from the paddle 16, and transmits to the equipment 80 a command established solely on the basis of the measured angular position of the paddle 16.

Then, throughout the duration of the downgraded operation mode, steps 122 and 126 are reiterated in a loop for each new measurement acquired from the sensor 50, in order to control the equipment 80 on the basis of the angular position of the paddle 16 alone. During these reiterations of steps 122 and 126, step 124 is no longer executed since the blocked paddle has already been identified.

The phase 120 of operation in downgraded mode is here followed by a maintenance phase 130. During this phase 130, the module 78 transmits, via a human-machine interface, the information that the paddle 18 of the paddle button 8 is blocked. The human-machine interface then displays this information to communicate it to the maintenance agent. Therefore, this maintenance agent is able to repair the failure of the paddle button 8.

Figure 4:
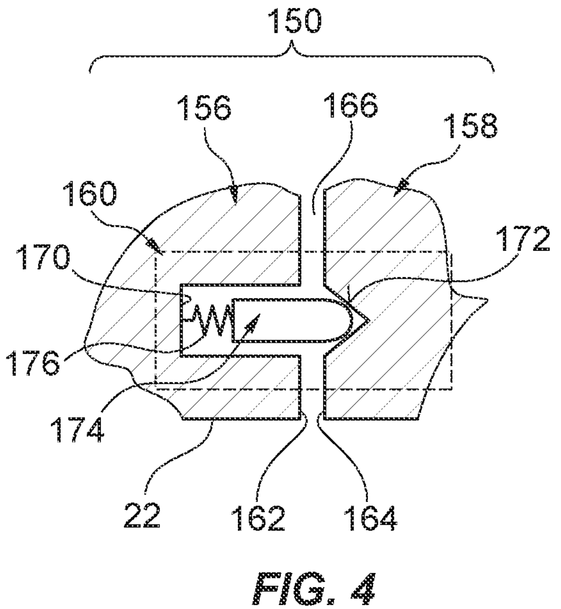
FIGS. 4 and 5 are schematic illustrations, in horizontal and partial section, of, respectively, a second and a third embodiment of the paddle button of FIG. 1.

FIG. 4 depicts a paddle button 150. This paddle button 150 is identical to the paddle button 8 except that:

- the paddles 16 and 18 are replaced by paddles 156 and 158, respectively, and
- the separable zone 20 is replaced by a separable zone 160.

Here, to simplify FIG. 4, only a partial horizontal section through the paddle button 150 is shown. This section has been taken along a horizontal plane of section that is perpendicular to the front faces of the paddles 156 and 158 and which passes through these front faces.

The paddles 156 and 158 are identical to the paddles 16 and 18, except that they are mechanically separated from each other. To this end, they each have a lateral face, 162 and 164 respectively, facing each other and which extends over the entire height of the paddle. These lateral faces 162, 164 extend mainly in a plane perpendicular to the plane containing the front face of these paddles. The hollow space between the lateral faces 162 and 164 forms a through-slot 166.

The separable zone 160 comprises:

- a blind hole 170 formed in the paddle 156 and which opens onto the lateral face 162,
- a housing 172 formed in the lateral face 164 opposite the blind hole 170,
- a pin 174 or a ball received inside the blind hole 170, and
- a spring 176 that permanently urges the pin 174 out of the blind hole 170.

The pin 174 is able to move, in sliding inside the blind hole 170, between a protruding position, shown in FIG. 4, and a retracted position. In the protruding position, the distal end of the pin 174 is received inside the housing 172. In this protruding position, the pin 174 allows only simultaneous movement of the paddles 156 and 158.

In the retracted position, the distal end of the pin 174 is no longer received inside the housing 172. In this retracted position, the pin 174 allows one paddle to move independently of the other paddle.

Of the housing 172 and of the distal end of the pin 174 at least one has an inclined face capable of converting the difference between the pressing forces exerted by the user on the front faces of the paddles 156, 158, into a horizontal force that pushes the pin 174 back toward the inside of the blind hole 170 against the return force of the spring 176. The stiffness of the spring 176 is chosen so that the pin 174 reaches its retracted position only when the difference between the pressing forces exerted by the user on the front faces of the paddles 156, 158 exceeds the threshold $S_1$.

Preferably, in this embodiment, the pin 174 is made of a material that does not break when the zone 160 yields. In addition, the separable zone 160 comprises a mechanism for retaining the pin 174 inside the hole 170. This mechanism retains the pin 174 inside the hole 170 even when the lateral face 164 is no longer opposite the lateral face 162.

The operation of the paddle button 150 can be deduced from the explanations given for the paddle button 8. In addition, the operation of the paddle button 150 has the following particular feature. This particular feature appears, for example, in the case where the blocking of the paddle 158 is a blocking that prevents it from reaching the pushed position but that does not prevent it from reaching the retracted position. In this case, when the paddle 156 returns from the pushed position to the retracted position, it crosses the paddle 158. At this moment, the pin 174 re-enters the housing 172. Thus, over the remainder of the path toward the retracted position, the paddles 156, 158 are again moved simultaneously.

Figure 5:
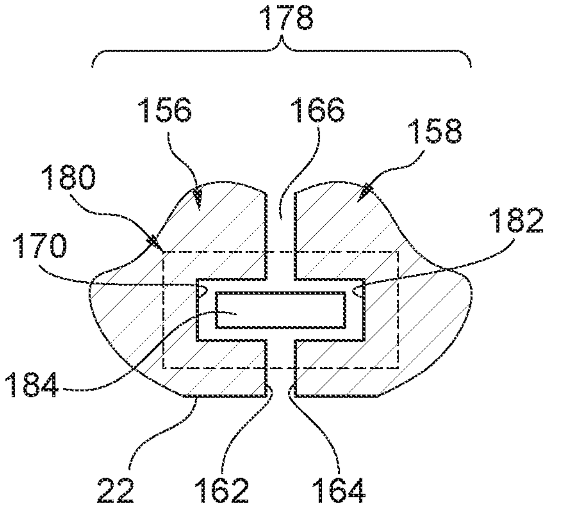

FIG. 5 shows a button 178 identical to the paddle button 150, except that the zone 160 is replaced by a separable zone 180. The separable zone 180 is identical to the separable zone 160 except that:

- the housing 172 is replaced by a blind hole 182;
- the pin 174 is replaced by a pin 184; and
- the spring 176 is omitted.

In this embodiment, the blind holes 170, 182 are configured to generate a shear stress in the pin 184 when the user presses on one of the paddles while the other paddle is blocked. For example, unlike in the embodiment of FIG. 4, the blind hole 182 has no inclined face capable of generating a horizontal force that moves the pin 184 in translation inside these blind holes 170, 182.

In this embodiment, the pin 184 is made of a brittle material. More precisely, the pin 184 is capable of breaking as soon as the difference between the pressing forces exerted by the user on the front faces of the paddles 156, 158 exceeds the threshold $S_1$. For example, the pin 184 is made of ceramic or hard plastic. Here, the pin 184 is mechanically distinct from the paddles 156 and 158.

Figure 6:
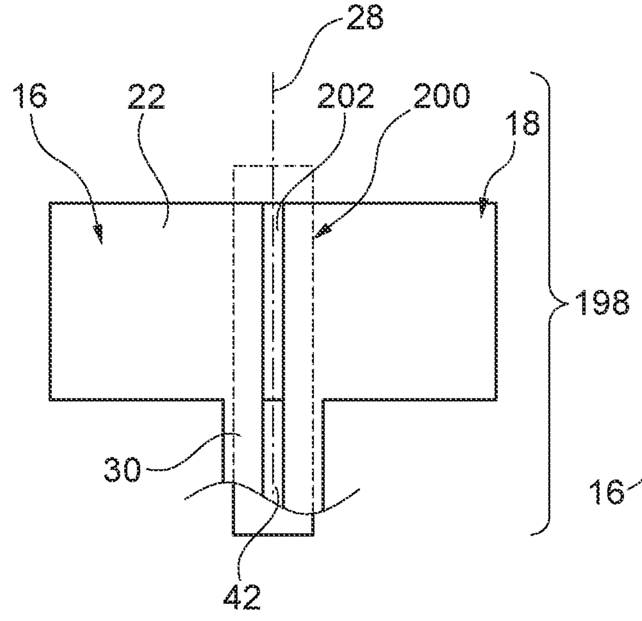
FIG. 6 is a partial front view of a fourth embodiment of the paddle button of FIG. 1.
Figure 7:
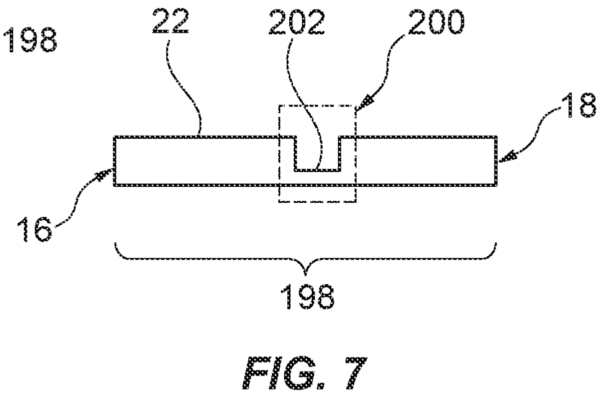
FIG. 7 is a schematic illustration in top view of the paddle button of FIG. 6.

FIGS. 6 and 7 depict a button 198 identical to the paddle button 8, except that the separable zone 20 is replaced by a separable zone 200. The zone 200 is identical to the zone 20, except that the upper recess 40 and the arm 44 are replaced by a non-through recess 202. The recess 202 here forms a groove that extends along the boundary 28 and forms a thinning of materials in the block of material from which the paddles 16 and 18 are made. Here, the depth of the recess 202 is adjusted so that the zone 200 yields as soon as the difference between the pressing forces exerted by the user on the front faces of the paddles 16 and 18 exceeds the threshold $S_1$.

Section II: Variants

Other embodiments of the separable zone are possible. For example, the separable zone 160 is replaced by a separable zone produced using a first and a second permanent magnet. The first and second permanent magnets are fixed, without any degree of freedom, on the first and second paddles 156 and 158, respectively. In the normal operation mode, the south pole of the first magnet is stuck to the north pole of the second permanent magnet so as to ensure a rigid connection between the paddles 156, 158 as long as the difference between the pressing forces exerted by the user on the front faces of these paddles does not exceed the threshold $S_1$. When the difference between the pressing forces exerted by the user on the front faces of the first and second paddles exceeds this threshold $S_1$, then the shear force is sufficient to detach the first magnet from the second permanent magnet. The separable zone therefore yields. Thus, if, for example, it is the first paddle that is blocked and can no longer be moved, the second paddle can be moved from its retracted position to its pushed position. When the second paddle returns from the pushed position to the retracted position, it crosses the first paddle. At this moment, the first and second permanent magnets stick together again. Thus, over the remainder of the path toward the retracted position, the first and second paddles are again moved simultaneously. In this embodiment, the switch between the normal operation mode and the downgraded operation mode is reversible as in the embodiment of FIG. 4.

The recess 202 can also be made on the rear face of the paddles 16 and 18.

Alternatively, in the normal operation mode, the difference between the positions of the first and second paddles along the path 14 (e.g., a common path) is not zero. In this case, there is a constant difference between these positions.

Alternatively, the paddle button includes a return mechanism that automatically returns the button to its retracted position as soon as the user is no longer touching the lever 12.

In a simplified embodiment, the electrical connection 90 is omitted. In this case, terminals 60 and 62 can also be omitted.

In a simplified embodiment, the electrical connection 90 is present and the information that its part 92 has been severed, is fed back via the network 56. For this, for example, the module 76 is implemented in the paddle button 8 and not in the computer 70. In this case, the terminals 60 and 62 can also be omitted.

The path 14 along which the paddles move can be different from an arc of a circle. For example, as a variant, this path is a rectilinear path or a path having any other appropriate shape. For example, in a particular embodiment, the paddles can be moved, by the user, along a rectilinear path coinciding with the axis (e.g., vertical lateral boundary 28) and not along the common path 14. In this case, the paddle button works like a push-button. In the normal operation mode, both paddles are depressed simultaneously. In the downgraded operation mode, it is possible to continue using the button by depressing only one of the two paddles.

Other shapes and dimensions for the paddles are possible. For example, in one particular embodiment, the paddles are intended to be moved, not using a single digit, but using several digits or even using one or both of the user's hands or using the user's foot. In each of these cases, the dimensions of the paddles must be adapted to suit the intended use. When a paddle is intended to be pushed by the user's hand, the force $F_{min}$ can be between 30 N and 150 N and, most often, between 30 N and 100 N.

As a variant, the sensors 50 and 52 are replaced by all-or-nothing sensors that indicate only whether or not the paddle has reached its pushed position.

Section III: Advantages of the Described Embodiments

The separable zone makes it possible to guarantee that during the normal operation mode, the two paddles are systematically moved in parallel. This therefore prevents an accidental difference from appearing between the positions of the first and second paddles. Thus, any unexpected operation of the controlled equipment 80 is avoided.

In addition, since the difference between the measurements of the two sensors is systematically constant during the normal operation phase, a variation in the difference between the positions measured by these sensors is a reliable indicator of a button failure.

The button described here also has the advantage of also being able to be used in a downgraded operation mode in which only one of the paddles is used. This is made possible by the fact that each paddle can be moved independently of the other and by the fact that the user can easily cause the separable zone to yield and therefore free the movement of one of the paddles with respect to the other.

This increases the robustness of the button against failures such as the accidental blocking of the movement of one of the paddles. Indeed, in this case, the button remains usable all the same, by moving only the paddle that is not blocked.

In addition, this button is also tolerant with respect to a malfunction of one of the sensors, because, in this case, the position is measured by the other sensor.

The breakage of the electrical connection 90 when the separable zone yields makes it possible to indicate to the computer 70, simply and reliably, that a failure has occurred. The module 78 can then simply identify the part that is to be replaced.

The fact of forming the two paddles 16, 18 and the separable zone 20 from the same block of material simplifies the manufacture of the paddle button 8. For example, the two paddles and the separable zone can then be produced using a single mold and a single molding operation.

Creating the separable zone using a breakable pin 184, distinct from the paddles 156 and 158, makes it possible to replace the broken pin with a new, intact, pin without the need to systematically replace these two paddles 156, 158.

Creating the separable zone using the pin 174 also makes it possible to restore the mechanical connection between the two paddles 156 and 158 without necessarily having to replace at least one of these paddles.

The invention claimed is:

1. A paddle button operable by a user, the paddle button comprising:

a first paddle and a second paddle each capable of moving parallel to a common path, between a retracted position and a pushed position when the user presses on at least one of the paddles, a first sensor capable of measuring a position of the first paddle along the common path independently of a position of the second paddle along the common path, and a second sensor capable of measuring the position of the second paddle along the common path independently of the position of the first paddle along the common path, wherein:

the first and second paddles are mechanically attached to each other only via a separable zone so as to allow only simultaneous movement of the first and second paddles as long as no blocking of one of the paddles relative to an other of the paddles occurs, the separable zone is capable of yielding as soon as a difference between pressing forces exerted, on the first and second paddles respectively, exceeds a predetermined threshold, the predetermined threshold being adjusted so that the predetermined threshold is crossed if the user presses on one of the paddles while movement of the other of the paddles is blocked, and when the separable zone has yielded, the first paddle and the second paddle can be moved independently of each other parallel to the common path.

2. The paddle button as claimed in claim 1, wherein the paddle button comprises:

two electrical terminals capable of being connected to a fault diagnosis module, and an electrical connection that electrically connects the electrical terminals together, a part of the electrical connection being attached to the separable zone so as to be severed when the separable zone yields.

3. The paddle button as claimed in claim 1, wherein:

the paddle button comprises one and a same block of material from which the first and second paddles are formed, the first and second paddles each comprise a pressing face, the pressing faces of each of the paddles extending, one beside the other, mainly in a plane perpendicular to the common path and being each located on a respective side of a lateral boundary, and the separable zone comprises one or more recesses made, in the block of material, along the lateral boundary to cause the block of material to break along the lateral boundary as soon as the difference between the pressing forces exerted, on the first and second paddles respectively, exceeds the predetermined threshold.

4. The paddle button as claimed in claim 1, wherein:
the first and second paddles each comprise:
a pressing face, the pressing faces of each of the paddles extending one beside another mainly in a plane perpendicular to the common path, and
a lateral face that extends mainly perpendicular to the pressing face, the lateral faces of each of the paddles facing toward each other and being separated from each other by a through-slot, and
the separable zone comprises:
a first hole made in the lateral face of the first paddle and a second hole made in the lateral face of the second paddle opposite the first hole, and
a pin, mechanically distinct from the first and second paddles, the pin comprising one end received in the first hole and an opposite end received in the second hole so as to mechanically connect the first and second paddles to each other and allow only simultaneous movement of the first and second paddles as long as no blocking of one of the paddles relative to the other of the paddles occurs, the pin being made of a brittle material capable of breaking as soon as the difference between the pressing forces exerted, on the first and second paddles respectively, exceeds the predetermined threshold.

5. The paddle button as claimed in claim 1, wherein:
the first and second paddles each comprise:
a pressing face, the pressing faces of each of the paddles extending one beside another of the pressing faces mainly in a plane perpendicular to the common path, and
a lateral face that extends mainly perpendicular to the pressing face, the lateral faces of each of the paddles facing toward each other and being separated from each other by a through-slot, and
the separable zone comprises:
a blind hole opening onto the lateral face of the first paddle and a housing formed, opposite the hole, in the lateral face of the second paddle,
a pin having a distal end facing toward the lateral face of the second paddle, the pin being able to slide inside the blind hole between:
a protruding position in which a distal end of the pin is received inside the housing so as to mechanically connect the first and second paddles together and allow only simultaneous movement of the first and second paddles as long as no blocking of one of the paddles relative to the other of the paddles occurs, and
a retracted position, retracted inside the blind hole and in which the pin allows the user to move one of the paddles independently of the other of the paddles, and
a spring that permanently urges the pin toward the protruding position and that allows the pin to move toward the retracted position only when the difference between the pressing forces exerted, on the first and second paddles respectively, exceeds the predetermined threshold.

6. The paddle button as claimed in claim 1, wherein the separable zone is capable of resisting, and therefore of not yielding, as long as the pressing force exerted by the user on one of the paddles while the movement of the other of the paddles is blocked, does not exceed $2F_{min}$, where $F_{min}$ is a minimum force that the user must exert on the paddles to move them simultaneously from their retracted positions to their pushed positions.

7. The paddle button as claimed in claim 6, wherein the force $F_{min}$ is between 0.5 N and 10 N.

8. The paddle button as claimed in claim 6, wherein the force $F_{min}$ is between 30 N and 150 N.

9. The paddle button as claimed in claim 1, wherein the separable zone is capable of yielding as soon as the pressing force exerted by the user on one of the paddles while the movement on the other of the paddles is blocked, exceeds $5F_{min}$, where $F_{min}$ is a minimum force that the user must exert on the paddles to move them simultaneously from their retracted positions to their pushed positions.

10. A method of operating a paddle button as claimed in claim 1, wherein:
during a normal operation phase, the separable zone mechanically connects the two paddles together so that, when the user presses on at least one of the two paddles, the two paddles systematically move simultaneously between their retracted positions and their pushed positions,
in an event of blocking of the movement of the first paddle and in response to a pressing force exerted by the user on only the second paddle, the separable zone yields and the paddle button switches into a downgraded operation phase, and
during the downgraded operation phase, the separable zone no longer mechanically connects the two paddles together so that the second paddle can be moved, by the user, between the retracted and pushed positions independently of the first paddle.

* * * * *